(12) United States Patent
Abeygunawardana et al.

(10) Patent No.: US 12,383,100 B2
(45) Date of Patent: Aug. 12, 2025

(54) SYSTEMS AND METHODS FOR BOWL SUPPORT ON A STAND MIXER

(71) Applicant: Haier US Appliance Solutions, Inc., Wilmington, DE (US)

(72) Inventors: Danister Abeygunawardana, Jeffersonville, IN (US); Tomas Garces, Louisville, KY (US); Matthew R. Hunter, Louisville, KY (US); Eric Matthew Lewis, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 663 days.

(21) Appl. No.: 17/839,560

(22) Filed: Jun. 14, 2022

(65) Prior Publication Data

US 2023/0397767 A1   Dec. 14, 2023

(51) Int. Cl.
*A47J 43/044* (2006.01)
*A47J 43/07* (2006.01)

(52) U.S. Cl.
CPC ......... *A47J 43/044* (2013.01); *A47J 43/0705* (2013.01); *A47J 2043/04454* (2013.01)

(58) Field of Classification Search
CPC .......... A47J 43/044; A47J 43/0705; A47J 2043/04454; B01F 35/40; B01F 35/42; B01F 35/43

See application file for complete search history.

(56) References Cited

U.S. PATENT DOCUMENTS

| | | | |
|---|---|---|---|
| 1,774,509 A * | 9/1930 | Gould | A47J 43/08 74/371 |
| 5,653,535 A * | 8/1997 | Xie | A21C 1/14 366/100 |
| 7,690,835 B2 | 4/2010 | Schnipke et al. | |
| 7,950,843 B2 * | 5/2011 | Blackburn | A47J 43/0705 220/660 |

(Continued)

FOREIGN PATENT DOCUMENTS

| CN | 211672160 U | 10/2020 |
|---|---|---|
| KR | 200442535 Y1 | 11/2008 |

OTHER PUBLICATIONS

Stockton et al., "The Best Stand Mixer", Wirecutter, New York Times, Nov. 24, 2021, 24 Pages, Retrieved From: https://www.nytimes.com/wirecutter/reviews/best-stand-mixer/.

*Primary Examiner* — Marc C Howell

(74) *Attorney, Agent, or Firm* — Dority & Manning, P.A.

(57) ABSTRACT

A stand mixer includes a base with a column mounted to the base, and a head fixed atop the column. The stand mixer also includes a bowl and a bowl carrier mounted on the column. The bowl carrier includes two arms extending forward from the back portion of the bowl carrier. The bowl carrier defines a pocket at the back portion of the bowl carrier. The pocket is configured for receiving a bowl retention protuberance of the bowl when the bowl is mounted on the two arms. Each of the two arms defines a respective orifice on a top portion of the two arms. Each of the two arms includes a respective plunger. The orifice of each of the two arms configured for (Continued)

receiving a respective locking tab of the bowl. The plunger of each of the two arms has an end portion that extends into the orifice to engage the respective locking tab on the bowl, when the bowl is mounted on the two arms.

18 Claims, 7 Drawing Sheets

(56) References Cited

U.S. PATENT DOCUMENTS

| | | | |
|---|---|---|---|
| 8,251,567 B2 | 8/2012 | Brunswick et al. | |
| 2005/0002272 A1* | 1/2005 | Brunswick | B01F 35/7548 |
| | | | 366/207 |
| 2023/0047574 A1* | 2/2023 | Anand | B01F 35/42 |
| 2023/0210309 A1* | 7/2023 | Turner | A47J 43/0711 |
| | | | 366/207 |

* cited by examiner

SYSTEMS AND METHODS FOR BOWL SUPPORT ON A STAND MIXER

FIELD OF THE INVENTION

The present disclosure relates generally to bowl carriers for stand mixers, more particularly for securely mounting of a bowl on a stand mixer.

BACKGROUND OF THE INVENTION

Stand mixers are generally used for performing automated mixing, churning, or kneading involved in food preparation. Typically, stand mixers include a motor configured to provide torque to one or more driveshafts. Users may connect various utensils to the one or more driveshafts, including whisks, spatulas, or the like. Stand mixers generally include support for mounting a bowl on the stand mixer during operation. The various utensils may extend down into the bowl to perform the mixing of the ingredients in the bowl. However, the bowl is frequently loosely mounted on the stand mixer, which can cause shifting or movement of the bowl during mixing.

BRIEF DESCRIPTION OF THE INVENTION

Aspects and advantages of the invention will be set forth in part in the following description, or may be apparent from the description, or may be learned through practice of the invention.

The present subject matter provides stand mixer with a bowl, a post, and a bowl carrier. Advantageously, the stand mixer allows for the secure mounting of the bowl on the bowl carrier easily and efficiently. A method for retaining a bowl on a stand mixer is also provided. Aspects and advantages of the invention will be set forth in part in the following description, may be apparent from the description, or may be learned through practice of the invention.

In one example embodiment, a stand mixer includes a base with a column mounted to the base, and a head fixed atop the column. The stand mixer also includes a bowl and a bowl carrier mounted on the column. A back portion of the bowl carrier is positioned adjacent the column. The bowl carrier includes two arms extending forward from the back portion of the bowl carrier. The bowl is selectively mountable on the two arms of the bowl carrier. The bowl carrier defines a pocket at the back portion of the bowl carrier. The pocket faces forward such that the pocket is configured for receiving a bowl retention protuberance of the bowl when the bowl is mounted on the two arms. Each of the two arms defines a respective orifice on a top portion of the two arms. Each of the two arms includes a respective plunger. The orifice of each of the two arms configured for receiving a respective locking tab of the bowl, when the bowl is mounted on the two arms. The plunger of each of the two arms has an end portion that extends into the orifice to engage the respective locking tab on the bowl, when the bowl is mounted on the two arms.

In another example embodiment, a method of for retaining a bowl on a stand mixer is provided. A bowl carrier of the stand mixer is mounted on a column of the stand mixer, a back portion of the bowl carrier is positioned adjacent the column, and two arms of the bowl carrier extend forward from the back portion of the bowl carrier. The bowl carrier defines a pocket at the back portion of the bowl carrier, the pocket faces forward such that the pocket is configured for receiving a bowl retention protuberance on the bowl when the bowl is mounted on the two arms. Each of the two arms defines a respective orifice on a top portion of the two arms, each of the two arms includes a respective plunger, the orifice on each of the two arms is configured for receiving a respective locking tab of the bowl. The plunger of each of the two arms has an end extending into the orifice to engage the respective locking tab of the bowl. The method includes securing the bowl on the bowl carrier by inserting the bowl retention protuberance into the pocket and inserting each locking tab of the bowl into a respective orifice on the two arms.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
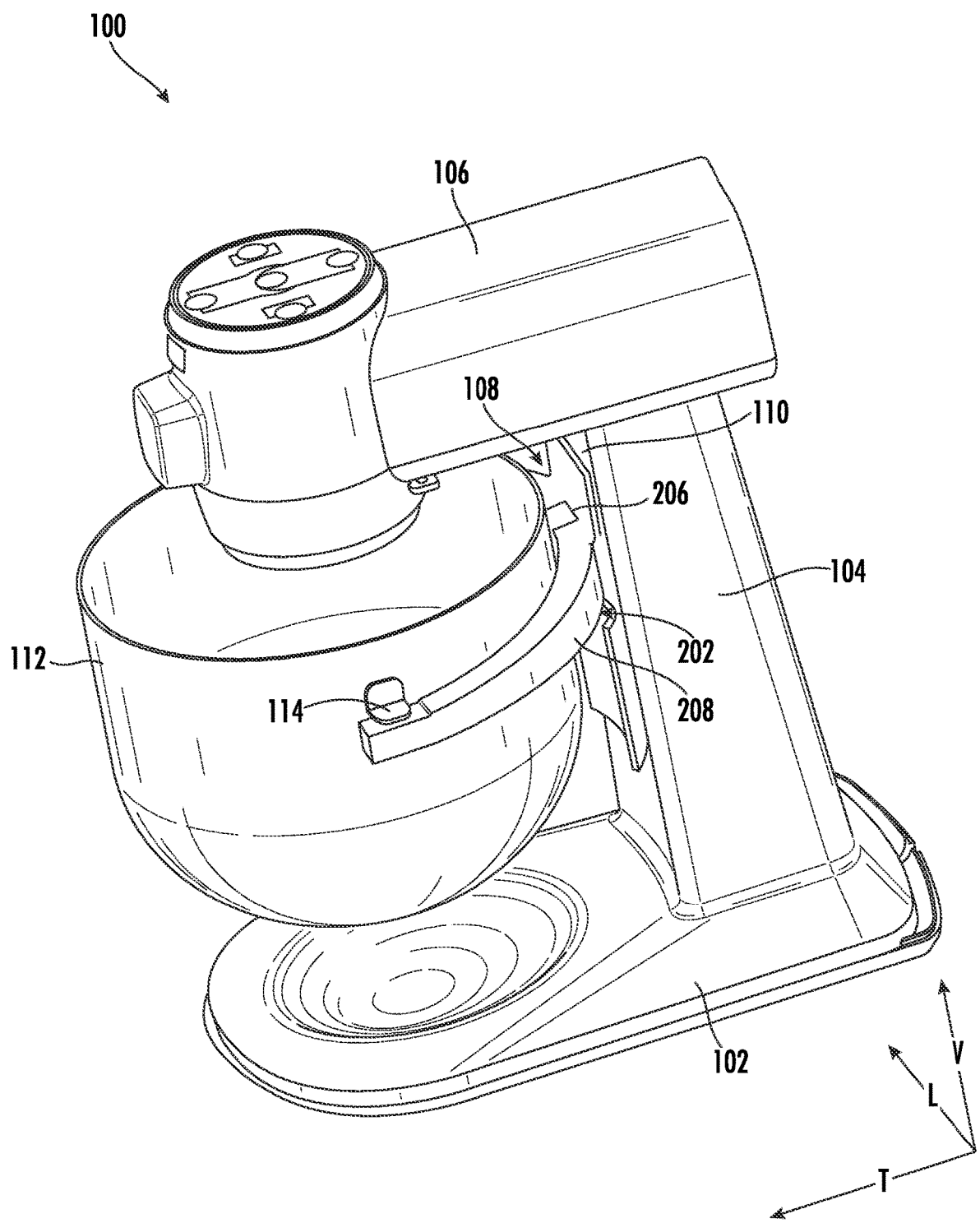
FIG. 1 illustrates an isometric perspective view of an example embodiment of a stand mixer of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

FIG. 1 provides an isometric view of a stand mixer 100 according to an example embodiment of the present subject matter. It will be understood that stand mixer 100 is provided by way of example only and that the present subject matter may be used in or with any suitable stand mixer in alternative example embodiments. Moreover, with reference to each of FIGS. 1 through 3, stand mixer 100 defines a vertical direction V, a lateral direction L, and a transverse direction T, which are mutually perpendicular and form an orthogonal direction system. It should be understood that these directions are presented for example purposes only, and that relative positions and locations of certain aspects of stand mixer 100 may vary according to specific embodiments, spatial placement, or the like.

Stand mixer 100 may include a base 102 and a support column 104. The support column 104 may support a mixer head 106, which is positioned atop column 104. The mixing head 106 may house a motor, a gearbox, and/or a drivetrain apparatus (not shown) of stand mixer 100. As shown in FIG. 1, head 106 may be mounted to column 104, which is mounted to base 102. Thus, column 104 may extend between and connect base 102 and head 106, e.g., along the vertical direction V. Head 106 may extend outwardly above the base 102 in the transverse direction T.

Column 104 may also include a bowl lift framework 108. Bowl lift framework 108 may slidably mount to a column rail 110, which is mounted to column 104. Additionally, components of bowl lift framework 108 may extend outwardly above the base 102, e.g., in the transverse direction T, and may hold bowl 112 above, vertically, base 102. Bowl 112 may be removably mounted on bowl lift framework 108 via flanges 114. Flanges 114 may be on opposite sides of the bowl 112 with respect to the circumference of the bowl. Bowl lift framework 108 and flanges 114 will be described in further detail herein.

Operation of stand mixer 100 is described below. In the operation of stand mixer 100, a user may load food items into bowl 112. The food items may be ingredients, such as flour, water, milk, etc. These items are provided for example purposes only and one skilled in the art would appreciate that there are many more types of food items that may be placed in bowl 112 of stand mixer 100. After loading the food items into bowl 112, a user turns on a motor to begin the process of mixing, kneading, beating, etc. The motor rotates an attachment attached to stand mixer 100 to complete each of these processes. The processes may be conducted with a respective attachment, such as a mixer blade for mixing, a dough hook for kneading, and a balloon whisk for beating.

Figure 2:
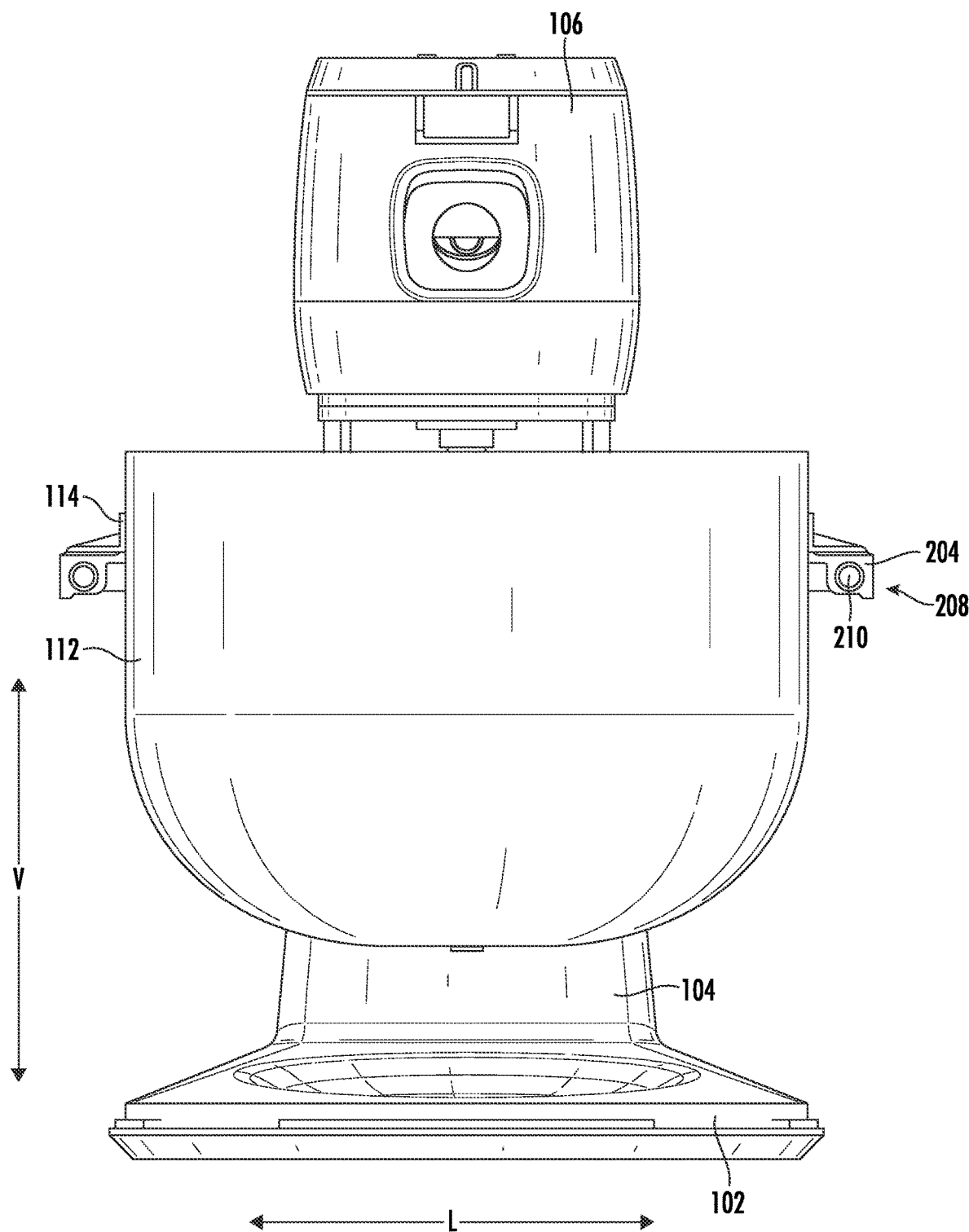
FIG. 2 illustrates a front, elevation view of the example stand mixer of FIG. 1.
Figure 3:
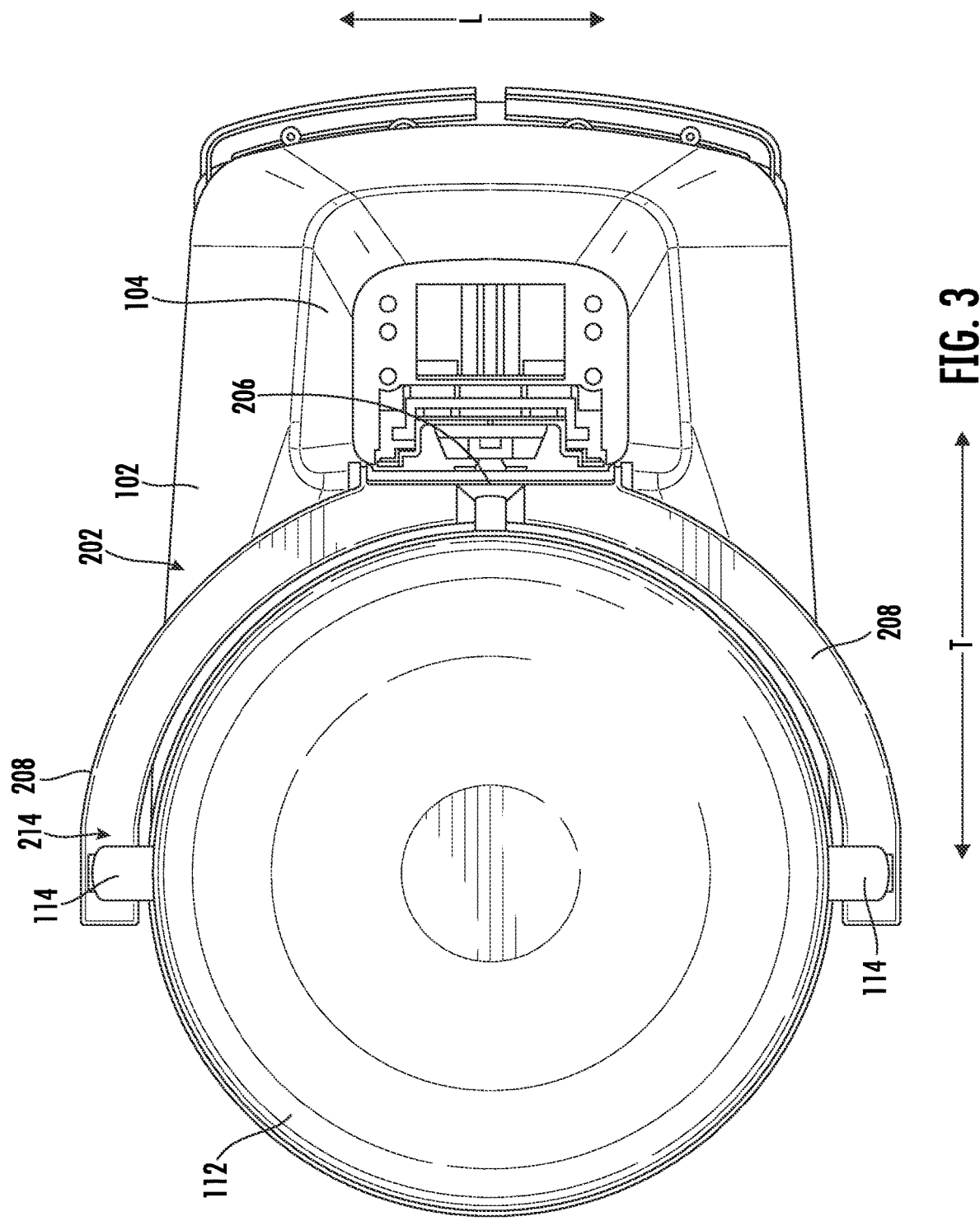
FIG. 3 illustrates a top, section view of the example stand mixer of FIG. 1.

With reference to FIGS. 2 and 3, bowl lift framework 108 may include a bowl carrier 202. A back portion 206 of bowl carrier 202 may be positioned adjacent column 104. Bowl carrier 202 may include two arms 208 extending forward from back portion 206 of bowl carrier 202. Bowl 112 may be selectively mountable on the two arms 208 of bowl carrier 202. Arms 208 may include a mounting tab 204 at the ends of arms 208 of bowl carrier 202. Bowl carrier 202 may hold bowl 112 via mounting tab 204. Mounting tab 204 will be described in further detail herein. FIG. 3 shows a top, section view of stand mixer 100. Flanges 114 may be positioned on opposing signs of bowl 112. For example, flanges 114 may be positioned to engage with bowl carrier 202 at each end of the arms of bowl carrier 202.

Figure 4:
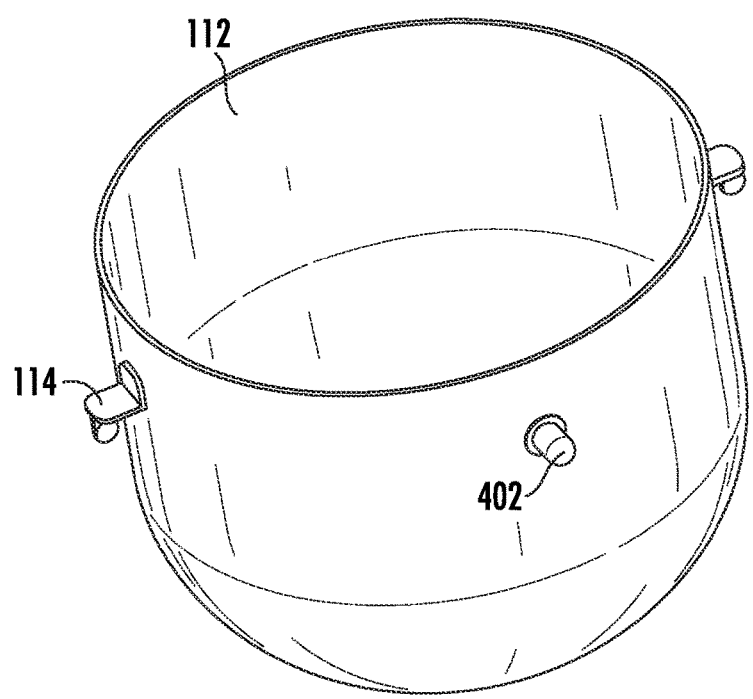
FIGS. 4 through 6 provide detailed views of the bowl of the example stand mixer of FIG. 1.
Figure 5:
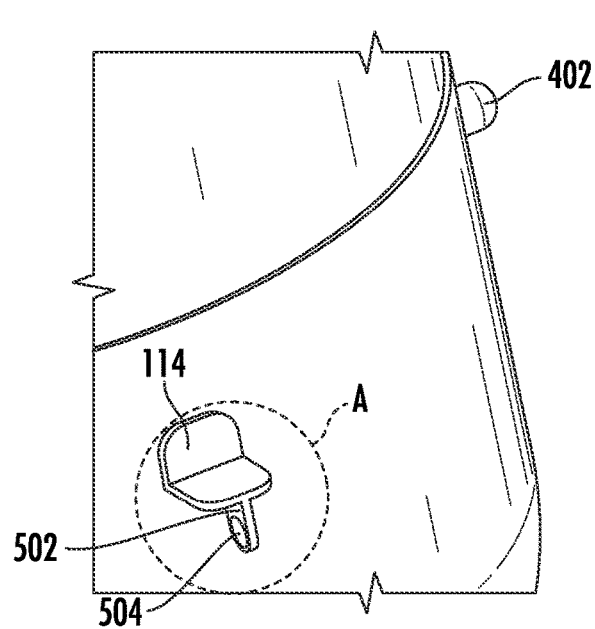
Figure 6:
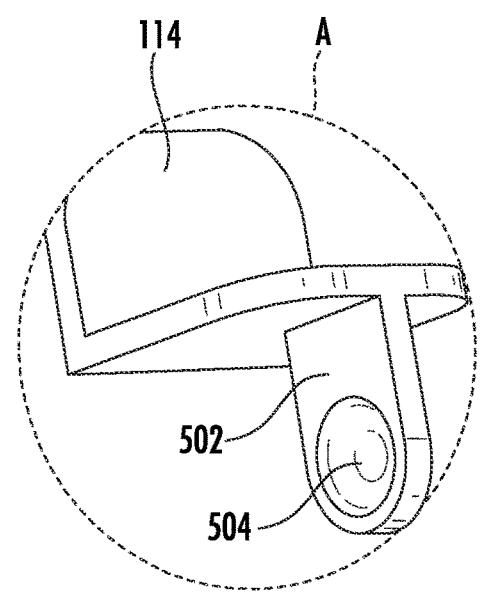
Figure 7:
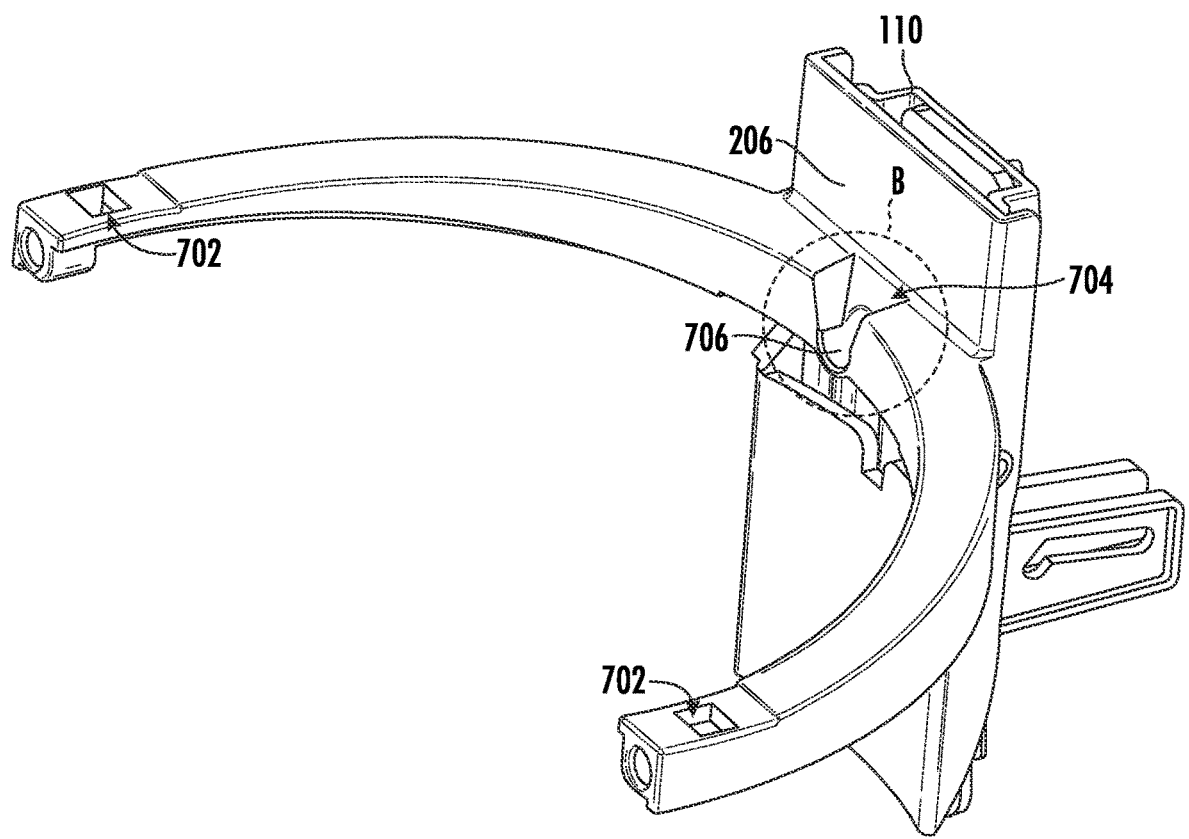
FIGS. 7 through 10 provide detailed views of the bowl carrier of the example stand mixer of FIG. 1.

FIGS. 4 through 6 demonstrate bowl 112 and components thereon. Seen in FIG. 4 is a bowl retention protuberance 402. In certain example embodiments, bowl retention protuberance 402 may be one of a pin, a fin, and a post. FIGS. 5 and 6 illustrate a locking tab 502 extending from flange 114. Locking tab 502 defines a plunger receiver 504 as described further herein.

Figure 10:
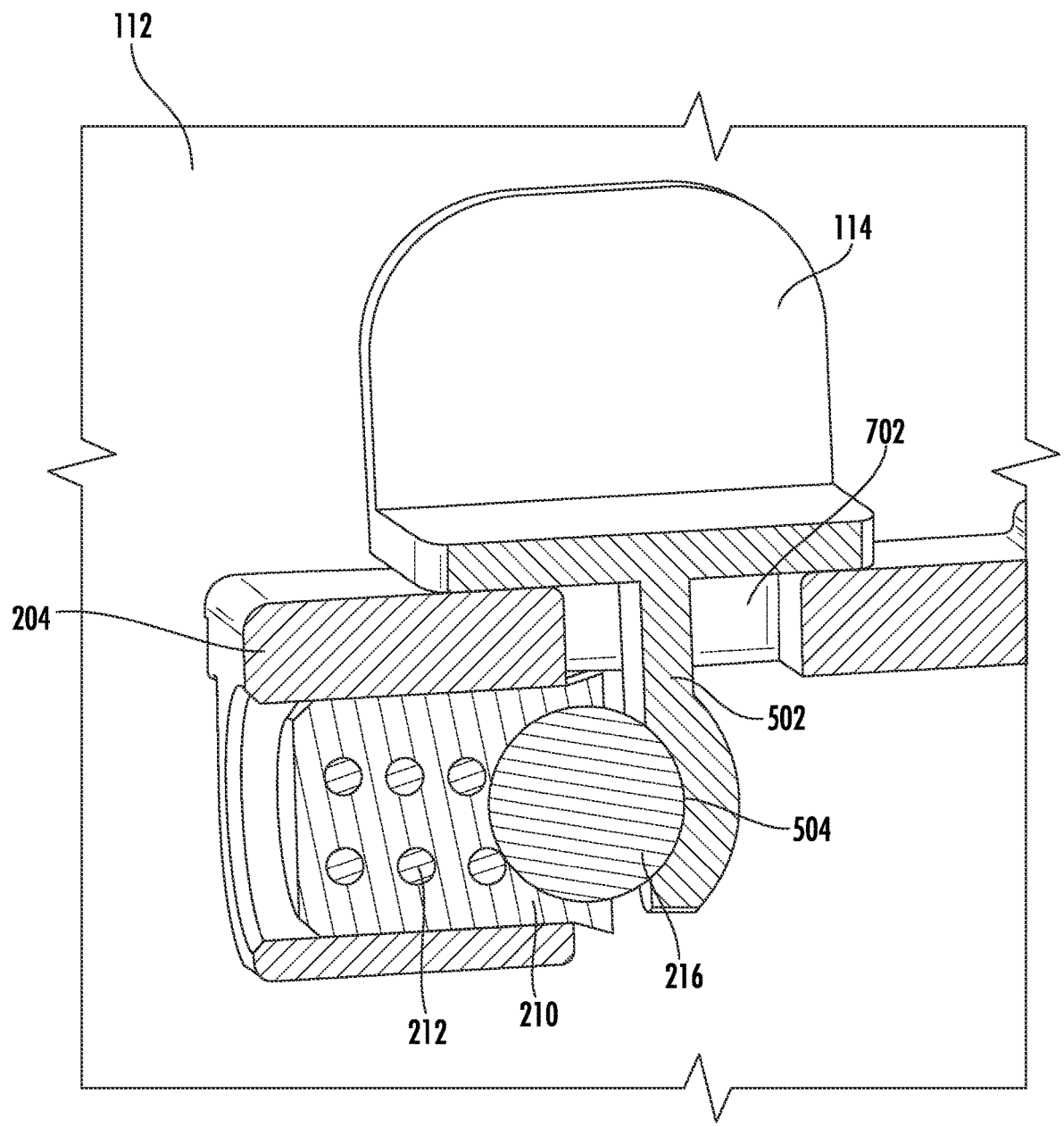

FIGS. 7 through 10 illustrate bowl carrier 202 and components thereon. Orifices 702 may be located on a top portion 214 at each end of arms 208, and orifices 702 may be configured for receiving locking tab 502 of flange 114. A pocket 706 may be positioned on back portion 206 of bowl carrier 202. Pocket 706 may define an opening 704 for receiving bowl retention protuberance 402. The arms 208 include a respective plunger 210 (FIG. 2) in mounting tab 204. Plunger 210 may be a spring plunger or a ball plunger. In the present example embodiment, plunger 210 includes spring 212 as shown in FIG. 10. End portion 216 of plunger 210 engages with plunger receiver 504 to secure locking tab 502 to bowl carrier 202

Figure 8:
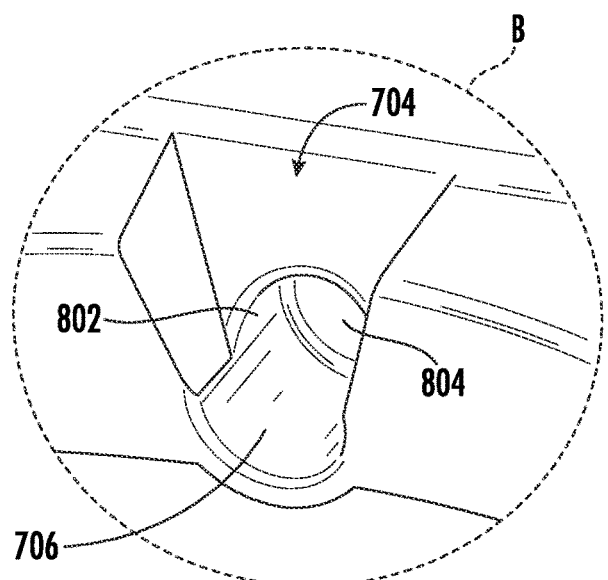
Figure 9:
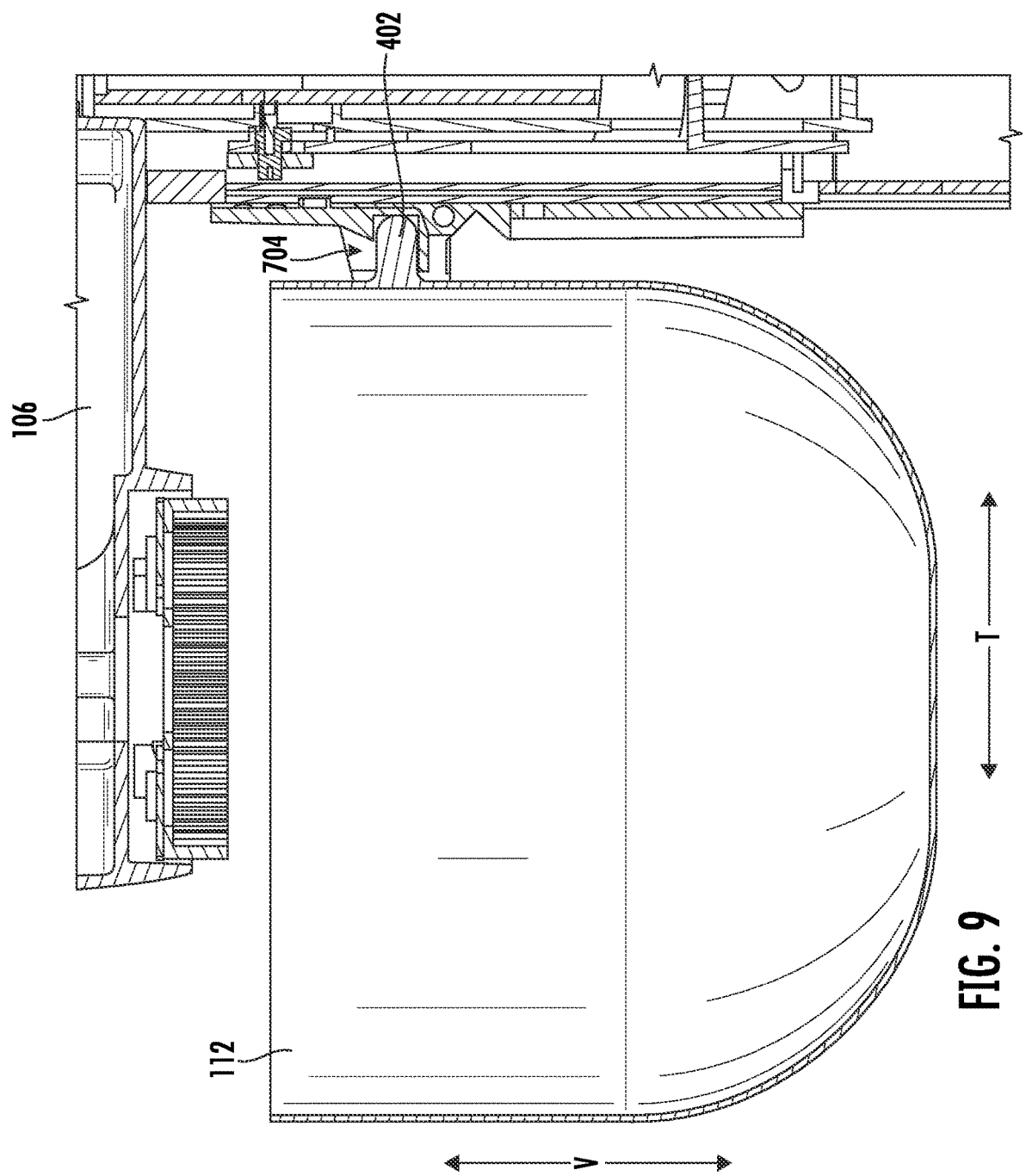

Pocket 706 may support bowl retention protuberance 402, and, as shown in FIG. 8, pocket 706 may include a cuff 802 at a back 804 of pocket 706. The cuff 802 may be configured to receive bowl retention protuberance 402 on bowl 112 when bowl 112 is mounted on the two arms 208. Cuff 802 may be configured to selectively fix bowl retention protuberance 402 in pocket 706. Cuff 802 may include a friction member (not shown), such as a rib or ridge to securely fix bowl retention protuberance 402 on bowl 112 to the back portion 206 of bowl carrier 202.

A method for retaining bowl 112 on a stand mixer 100 includes securing bowl 112 on bowl carrier 202 by inserting bowl retention protuberance 402 into pocket 706 and inserting each locking tab 502 of bowl 112 into a respective orifice 702 on the two arms 208. The method may also include angling bowl 112 upward while inserting bowl retention protuberance 402 into pocket 706. Then, angling the bowl 112 downward in order to insert each locking tab 502 of bowl 112 into the respective orifice 702 on the two arms 208. Further, in alternative example embodiments, the method may include placing bowl retention protuberance 402 in pocket 706 and sliding bowl retention protuberance 402 into cuff 802.

The method may further include inserting each locking tab 502 of bowl 112 into a respective orifice 702 on the two arms 208 which includes first depressing the end of each plunger 210 with the respective locking tab 502 and then receiving the end of plunger 210 within the respective plunger receiver 504 as each locking tab 502 is received by the respective orifice 702.

As may be seen from the above, stand mixer 100 may rigidly hold bowl 112 on bowl carrier 202. Bowl retention protuberance 402 may be inserted into pocket 706 through opening 704. Locking tabs 502 may be inserted into orifices 702 where plunger 210 of mounting tab 204 may engage with plunger receiver 504, holding bowl 112 in place. Thus, bowl 112 may be rigidly mounted on stand mixer 100, which may prevent shifting or movement of bowl 112 during mixing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A stand mixer, comprising:
   a base;
   a column mounted to the base;
   a head positioned atop the column;
   a bowl; and
   a bowl carrier mounted on the column, a back portion of the bowl carrier positioned adjacent the column, the bowl carrier comprising two arms extending forward from the back portion of the bowl carrier, the bowl selectively mountable on the two arms of the bowl carrier, the bowl carrier defining a pocket at the back portion of the bowl carrier, the pocket facing forward such that the pocket is configured for receiving a bowl retention protuberance of the bowl when the bowl is mounted on the two arms, each of the two arms defining a respective orifice on a top portion of the two arms, each of the two arms comprising a respective plunger, the orifice of each of the two arms configured for receiving a respective locking tab of the bowl when the bowl is mounted on the two arms, the plunger of each of the two arms having an end portion that extends into the orifice to engage the respective locking tab on the bowl when the bowl is mounted on the two arms.

2. The stand mixer of claim 1, wherein the pocket is open at a top of the pocket, the pocket has a floor at a bottom of the pocket to support the bowl retention protuberance, and the pocket comprises a cuff at a back of the pocket that is configured to receive the bowl retention protuberance on the bowl when the bowl is mounted on the two arms.

3. The stand mixer of claim 2, wherein the cuff is configured to selectively fix the bowl retention protuberance in the pocket.

4. The stand mixer of claim 2, wherein the cuff comprises a friction member to securely fix the bowl retention protuberance on the bowl to the back portion of the bowl carrier.

5. The stand mixer of claim 1, wherein the plunger of each of the two arms is a spring plunger.

6. The stand mixer of claim 1, wherein the plunger of each of the two arms is a ball plunger.

7. The stand mixer of claim 1, wherein the bowl retention protuberance is one of a pin, a fin, and a post and is positioned to engage the pocket when the bowl is mounted on the two arms.

8. The stand mixer of claim 1, wherein each locking tab is shaped and positioned on the bowl to engage the respective orifice on each of the two arms.

9. The stand mixer of claim 1, wherein each locking tab is shaped to first translate and then receive the end of the plunger extending into the respective orifice on the two arms as each locking tab is received by the respective orifice.

10. A method for retaining a bowl on a stand mixer, a bowl carrier of the stand mixer mounted on a column of the stand mixer, a back portion of the bowl carrier positioned adjacent the column, two arms of the bowl carrier extending forward from the back portion of the bowl carrier, the bowl carrier defining a pocket at the back portion of the bowl carrier, the pocket facing forward such that the pocket is configured for receiving a bowl retention protuberance on the bowl when the bowl is mounted on the two arms, each of the two arms defining a respective orifice on a top portion of the two arms, each of the two arms comprising a respective plunger, the orifice on each of the two arms configured for receiving a respective locking tab of the bowl, the plunger of each of the two arms having an end extending into the orifice to engage the respective locking tab of the bowl, the method comprising:
   securing the bowl on the bowl carrier by inserting the bowl retention protuberance into the pocket; and
   inserting each locking tab of the bowl into a respective orifice on the two arms.

11. The method of claim 10, wherein securing the bowl on the bowl carrier comprises:
   angling a front of the bowl upward while inserting the bowl retention protuberance into the pocket; and
   then angling the front of the bowl downward in order to insert each locking tab of the bowl into the respective orifice on the two arms.

12. The method of claim 10, wherein:
   the pocket is open at a top of the pocket, the pocket has a floor at a bottom of the pocket to support the bowl retention protuberance, and the pocket comprises a cuff at a back of the pocket that is configured to receive the bowl retention protuberance on the bowl when the bowl is mounted on the two arms, and
   inserting the bowl retention protuberance into the pocket comprises placing the bowl retention protuberance on the floor of the pocket and sliding the bowl retention protuberance into the cuff.

13. The method of claim 12, wherein the cuff is configured for securely fixing the bowl retention protuberance of the bowl to the back portion of the bowl carrier.

14. The method of claim 10 wherein the bowl retention protuberance is one of a pin, a fin, and a post.

15. The method of claim 12, wherein the cuff comprises a friction member to securely fix the bowl retention protuberance on the bowl in the pocket.

16. The method of claim 10, wherein each locking tab is shaped and positioned on the bowl to engage the respective orifice on each of the two arms.

17. The method of claim 10, wherein the plunger of each of the two arms is a spring plunger and inserting each locking tab of the bowl into a respective orifice on the two arms comprises first depressing an end of each plunger with the respective locking tab and then receiving the end of the plunger within the respective locking tab as each locking tab is received by the respective orifice.

18. The method of claim 10, wherein the plunger of each of the two arms is a ball plunger and inserting each locking tab of the bowl into a respective orifice on the two arms comprises first depressing an end of each plunger with the respective locking tab and then receiving the end of the plunger within the respective locking tab as each locking tab is received by the respective orifice.

* * * * *